UNITED STATES PATENT OFFICE.

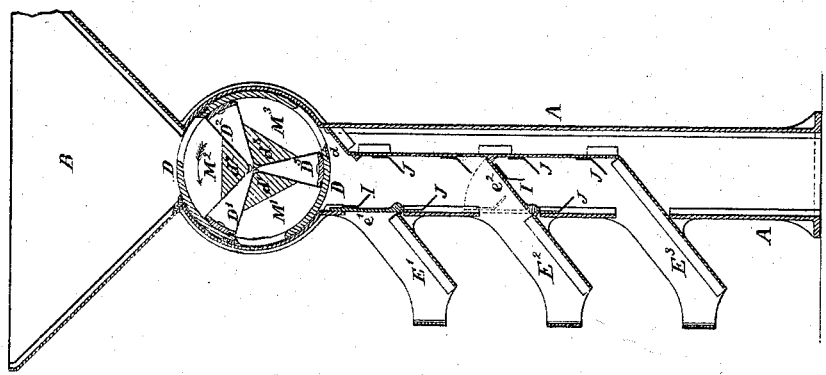
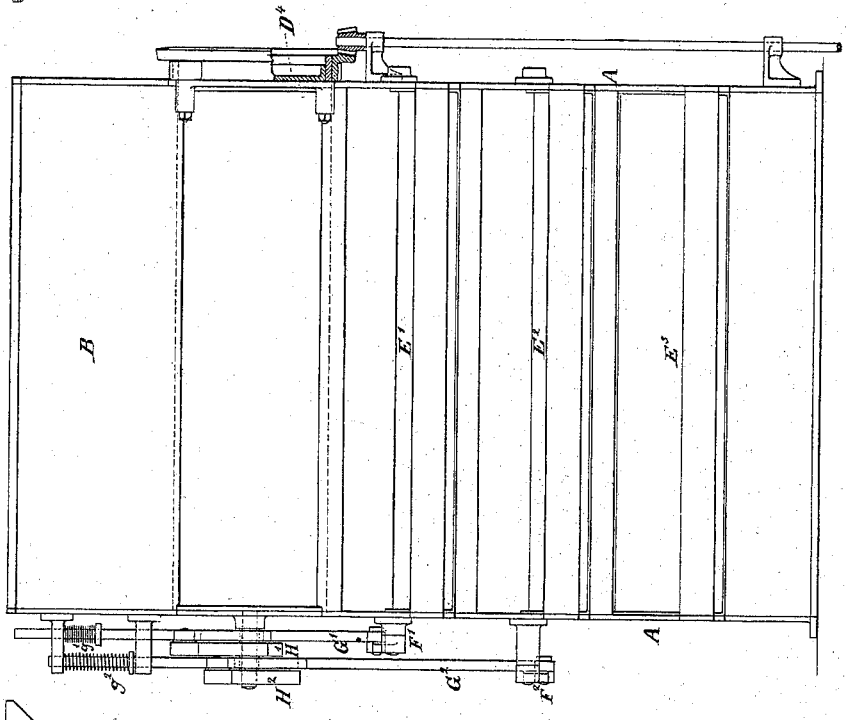
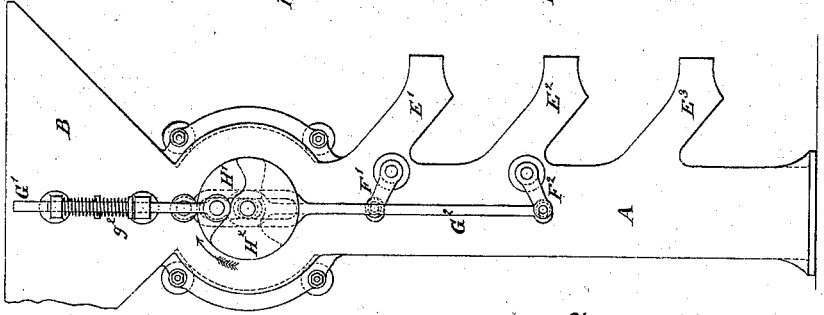

THOMAS F. ROWLAND, OF GREEN POINT, NEW YORK.

IMPROVEMENT IN GAS-RETORT CHARGERS.

Specification forming part of Letters Patent No. 137,487, dated April 1, 1873; application filed January 20, 1873.

*To all whom it may concern:*

Be it known that I, THOMAS F. ROWLAND, of Green Point, Brooklyn, Kings county, New York, have invented certain Improvements relating to Machines or Apparatus for Measuring Coal and Supplying it to Gas-Retorts, of which the following is a specification:

The apparatus described in my previous application for patent for charging gas-retorts has a revolving meter with only one aperture. A certain period is required for any meter to fill properly with coal, and, again, a certain period for it to empty.

My present improved apparatus provides a larger revolving meter with an increased number of apertures and chambers, so that one may be filling while another is emptying. It allows for the convenient changing of the capacities of the chambers by the insertion and removal of pieces. This allows the meter to be charged as the retorts become gradually filled or encumbered with gas carbon. It provides automatic mechanism for changing the position of the deflectors or valves that determine into which of the retorts the charge shall be placed. It provides steel knives for better cutting off the coal when an aperture in the meter passes out of contact with the supply-passage. It also provides checks for retarding the motion of the coal in descending to reach the lowermost of the retorts. This tends to equalize the velocity of the coal in passing into all the several retorts.

The following is a description of what I consider the best means of carrying out the invention.

The accompanying drawing forms a part of this specification.

Figure 1 is a front elevation; Fig. 2, an end elevation; and Fig. 3 a vertical section transverse to the axis of the revolving meter.

Similar letters of reference indicate like parts in all the figures.

A is a frame-work or casing, and which may, for the present purposes, be described as fixed, although I propose to mount it on wheels for convenient movement from one bench of retorts to the other. B is a hopper, in which the coal is deposited from a suspended bucket, or by other convenient means not represented. I will use the letter D to indicate the entire revolving portion of the meter, using the marks $D^1$ $D^2$, &c., to indicate special parts thereof, when necessary. The meter is of sufficient capacity to accommodate three charges, or the coal for three retorts. Each has a separate aperture for receiving and discharging, and the several chambers thereto connected are indicated by $M^1$ $M^2$ $M^3$. The aperture of each is armed with a stout angular-edged steel knife marked $d$. The chambers are bounded by removable pieces of boiler-iron marked, respectively, $D^1$ $D^2$ $D^3$, which are sustained in longitudinal grooves provided in the interior of the cylindrical shell or body D, as represented. The end $D^4$ of the revolving meter D is removable. On removing this the several sheet-metal partitions $D^1$ $D^2$ may be seized by any suitable means and drawn forcibly out with a motion parallel to the axis of the meter. I provide several sets of these partitions, differently shaped, so that by removing one set and inserting another I can change the capacity of the meter at will.

Another plan for accomplishing nearly the same end with a single set of partitions is represented in the drawing, where removable filling pieces, marked $d^1$ $d^2$ $d^3$, are introduced and removed at will. They may be held by bolts or nails, (not represented,) and when it is desired to reduce the capacity of a chamber the several filling pieces are removed and larger ones are introduced in their places; or, in some cases, a piece of board or other convenient piece of wood may be nailed or otherwise fastened on the outer face of a filling piece previously employed. It is easy to exchange these filling pieces $d^1$, &c., when the several partitions are drawn out from the meter.

When, in consequence of the clearing of the retorts from the gas carbon previously accumulated, or the introduction of new retorts, it becomes expedient to increase the capacities of the chambers $M^1$ $M^2$ $M^3$ the several partition-plates $D^1$ $D^2$ $D^3$ may be drawn out, the filling pieces removed, and the partitions being replaced the meter is again ready to deliver an amount of coal equal to the full capacities of the retorts as at first. The inclined spouts $E^1$ $E^2$ $E^3$ lead the coal, as will be understood, into retort-chargers carried at corresponding heights, and which are not here represented. I have, in my patent, dated the 24th September, 1872, described what I consider the best construction of the gas-charging machinery. This apparatus may be used with that or any other analogous mechanism which will receive the coal through a broad aperture in the upper portion of each charger. The valves $e^1$ $e^2$ are brought into play at the proper times and deflect the several chargers into the several spouts $E^1$ $E^2$. They are controlled by levers $F^1$ $F^2$, connected, by links $G^1$ $G^2$, to cams $H^1$ $H^2$, carried on the overhanging end of the meter-shaft. The cams hold them in their vertical positions during a greater portion of each revolution, but at the period when either should stand across the passage in the casing A and deflect its proper charge of coal into the connected spout the form of the cam allows the link to sink by gravity, aided by the springs $g^1$ $g^2$, and the valves are correspondingly placed in position. After the coal composing that charge has had sufficient time to entirely pass the cam raises the link again, and the valve rises into its vertical or idle position again. On the under side of each of the valves is an inclined deflector, I. This deflector is of no effect when the valve is in the inclined position across the casing A, but when the valve is in the upright position, forming, in effect, a portion of the vertical wall of the casing, the inclined deflector I becomes effective in retarding the descent of the coal, which is passing down through the casing to a lower spout. Each deflector tends to raise the coal and throw it against the opposite wall of the casing. There are other corresponding inclined deflectors fixed on the walls of the casing, as represented by J. The effect of the whole series of deflectors I and J is to so retard the coal that after falling through a considerable height—being alternately deflected from one side to the other of the casing—its velocity is little, if any, greater than that which it had in being first discharged from the meter. Some of the features of this invention may be usefully employed without the others. Thus, for example, the deflectors I and J may be used without the provisions for changing the capacities of the chambers $M^1$ $M^2$; so, also, the provision for automatically-working the valves $e^1$ $e^2$ may be used without the inclined deflectors.

What I claim as my invention, and desire to secure by these Letters Patent, is—

1. A revolving meter having two or more chambers, $M^1$ $M^2$, in combination with the hopper B, casing A, spouts $E^1$ $E^2$, and valves $e^1$ $e^2$, as and for the purposes herein specified.

2. In combination with the revolving meter D, the removable partitions $D^1$ $D^2$ adapted to be introduced and removed by a longitudinal motion, as herein specified.

3. In combination with the meter D, hopper B, casing A, spouts $E^1$ $E^2$, and movable valves $e^1$ $e^2$, the levers $F^1$ $F^2$, links $G^1$ $G^2$, and cams $H^1$ $H^2$, arranged for joint operation, as herein specified.

4. In combination with the hopper B, the revolving meter D, provided with the angular steel knives $d$ mounted in the meter and adapted to facilitate the division of the pieces of coal which stand across the mouth, as and for the purposes specified.

5. In combination with the meter D and several spouts $E^1$ $E^2$ mounted at different levels in the casing A, the deflectors I J arranged as shown and adapted to retard the descent of the coal to the lower spout or spouts, substantially as and for the purposes herein specified.

In testimony whereof I have hereunto set my hand this 16th day of January, 1873, in the presence of two subscribing witnesses.

THOMAS F. ROWLAND.

Witnesses:
THOMAS D. STETSON,
W. C. DEY.